US006694629B2

(12) United States Patent
Goodrich

(10) Patent No.: US 6,694,629 B2
(45) Date of Patent: *Feb. 24, 2004

(54) LASER PROJECTOR FOR PRODUCING INTERSECTING LINES ON A SURFACE

(75) Inventor: Gary Goodrich, Union City, CA (US)

(73) Assignee: Trimble Navigation LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/085,967

(22) Filed: Feb. 27, 2002

(65) Prior Publication Data

US 2003/0159299 A1 Aug. 28, 2003

(51) Int. Cl.[7] .................. G01C 15/02; G01B 11/26; B43L 13/00
(52) U.S. Cl. ................... 33/286; 33/227; 33/DIG. 21
(58) Field of Search .................. 33/286, 227, 228, 33/276, 277, 282, DIG. 21

(56) References Cited

U.S. PATENT DOCUMENTS

| | | | |
|---|---|---|---|
| 5,218,770 A | 6/1993 | Toga | 33/276 |
| 5,367,779 A * | 11/1994 | Lee | 33/227 |
| 5,539,990 A | 7/1996 | Le | 33/286 |
| 5,588,216 A * | 12/1996 | Rank et al. | 33/286 |
| 6,005,719 A | 12/1999 | Rando | 33/286 |
| 6,065,217 A | 5/2000 | Dong | 33/276 |
| 6,195,902 B1 * | 3/2001 | Jan et al. | 33/286 |
| 6,202,312 B1 | 3/2001 | Rando | 33/227 |
| 6,502,319 B1 * | 1/2003 | Goodrich et al. | 33/286 |

* cited by examiner

*Primary Examiner*—Christopher W. Fulton
(74) *Attorney, Agent, or Firm*—Thomas M. Freiburger

(57) ABSTRACT

A portable construction layout tool generates laser beams in two or more directions related by a specific angle, such as 90°. The instrument emits two fans of light in such a way as to project a pair of lines on the floor, wall or other surface on which the instrument is mounted or placed, with the intersection of the two being visible rather than being a virtual intersection hidden beneath the instrument itself, enabling easier setup. Compared to rotating-beam instruments, the disclosed device is simpler by avoiding moving parts and provides for better visibility. In a preferred embodiment the non-collimated beam from a laser diode is used, and is passed through a cylinder lens to converge the beam on the narrower axis to generate the desired fan of light to be projected as a line.

10 Claims, 3 Drawing Sheets

LASER PROJECTOR FOR PRODUCING INTERSECTING LINES ON A SURFACE

BACKGROUND OF THE INVENTION

The invention concerns optical layout or measuring equipment, and in particular encompasses a laser projector tool mounted on or placed against a surface, that produces intersecting lines on that surface without moving parts to project the lines, and with a visible line intersection displaced from the instrument housing, for more convenient use.

Laser-projecting instruments are well known in the field of surveying and construction layout and as measuring devices. Prior patents show several examples of such tools that project lines, primarily by rotating a beam to make an apparently solid line on a surface. Some such instruments have included two rotating projected beams to produce intersecting lines at right angles to each other. See, for example, U.S. Pat. Nos. 5,218,770 and 6,202,312 in which such devices are shown as prior art. See also U.S. Pat. No. 6,065,217.

It has also been known to form lines on a surface by placing a cylindrical lens in the path of a collimated laser beam, thus spreading a narrow beam of light into a planar fan of light that forms a line on a surface. Again, see U.S. Pat. No. 6,202,312 showing such instruments, and the disclosure of that patent is incorporated herein by reference, particularly as to discussion of prior art.

There have been laser tools that produce two lines with a visible intersection, such as described in U.S. Pat. No. 5,539,990, but with an important difference from the device of this invention. The prior tools produced the intersecting lines on a surface that is generally perpendicular to the surface on which the instrument rests.

Other laser reference tools have produced spots of light on a surface, rather than solid lines of light. For example, see U.S. Pat. No. 6,005,719.

See also copending application Ser. No. 09/684,696, now U.S. Pat. No. 6,502,319, owned by the assignee of this invention, showing generation of lines on a surface on which the instrument is placed.

It is among the objects of this invention to produce an efficient portable laser reference tool that generates at least two intersecting lines of laser light on a floor or other surface against which the tool is placed, with the intersection being displaced from the instrument and visible. An accompanying object is to generate such light beams and lines without the use of moving parts, such as spinning lasers or mirrors.

SUMMARY OF THE INVENTION

A portable construction layout tool generates laser beams in two directions related by a specific angle, such as 90°. The instrument emits two fans of light in such a way as to project a pair of lines on a floor, wall or other surface on which the tool is mounted, with the intersection of the two fans being visible rather than being a "virtual" intersection inside or below the instrument, thus enabling easier setup. Compared to rotating-beam instruments, the disclosed device is simpler by avoiding moving parts, and provides for better visibility. In a preferred embodiment the non-collimated beam from a laser diode is used, and is passed through a cylinder lens to converge the beam on the narrower axis to generate the desired fan of light to be projected as a line.

In one embodiment two different laser diodes and lenses are used to generate the two fans of light, and in another embodiment a single laser diode is employed, with optics to produce the two fans of light.

It is thus a primary object of the invention to provide a rugged and reliable laser instrument, without moving parts, to produce at least two lines of light on the floor or other surface on which the instrument is mounted or placed, with the intersection of the two lines visible to the user. These and other objects, advantages and features of the invention will be apparent from the following description of a preferred embodiment, considered along with the accompanying drawings.

DESCRIPTION OF THE PREFERRED EMBODIMENTS

The invention involves the use of two light beams combined to draw intersecting lines on the surface which the instrument is mounted or placed. The visible lines can be at a 90° angle or any other desired angle.

Figure 1:
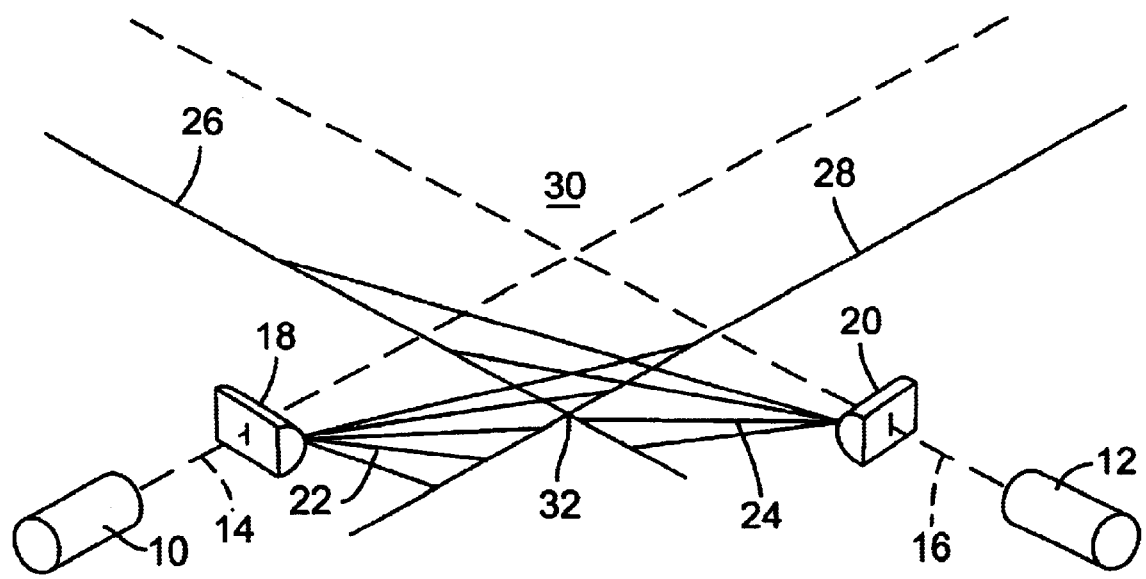
FIG. 1 is a schematic perspective view showing an implementation according to one embodiment of the invention.

In FIG. 1, two lasers 10 and 12 produce collimated beams 14 and 16 which are passed through cylinder lenses 18 and 20 to generate fans of light 22 and 24 which produce lines of light 26 and 28 on a surface 30, which is the surface against which the instrument's housing (not shown in FIG. 1) is placed. The lasers and optics are housed in or fixed to a single structure and are mechanically aligned to the desired angle between the fans 22, 24 and the intersecting lines 26, 28. The lines 26, 28 intersect at a point 32 visible to the user, projected outside the instrument. Note that in the implementation of FIG. 1 the beams approaching the cylinder lenses are collimated.

Figure 2:
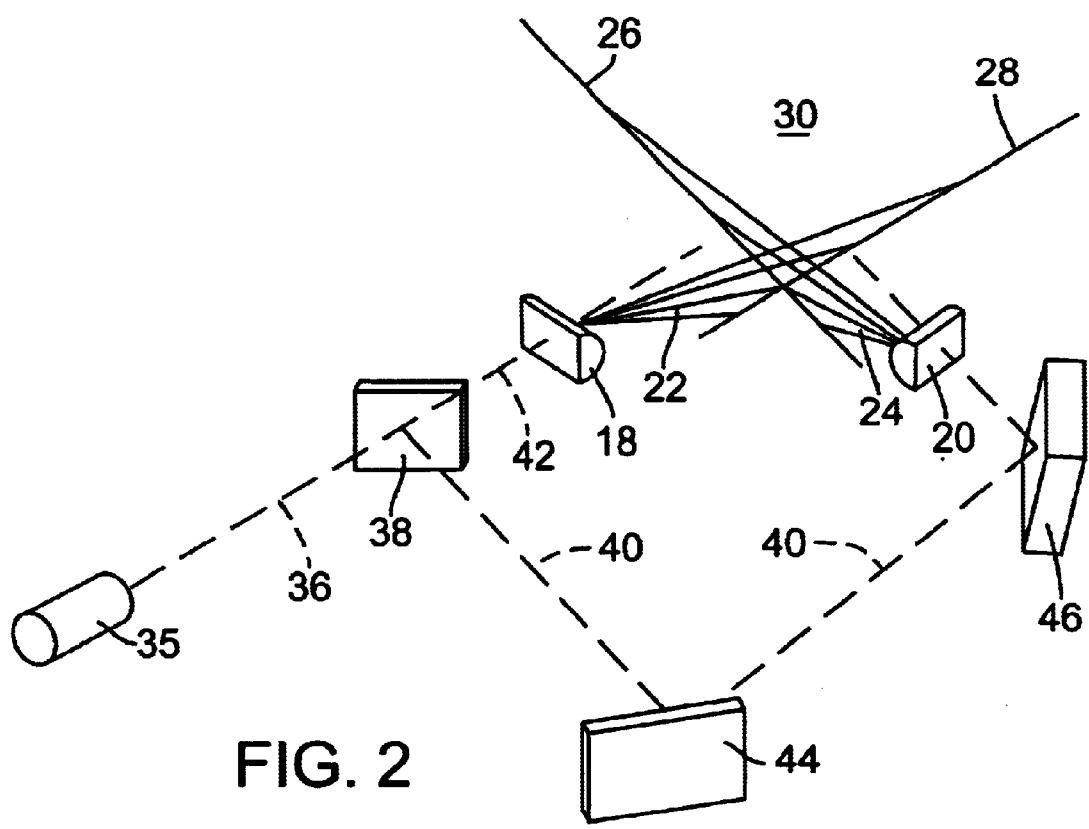
FIG. 2 is a similar schematic perspective view showing an implementation according to another embodiment of the invention.

FIG. 2 is an arrangement similar to FIG. 1, again utilizing two cylinder lenses 18, 20 to produce fans of light 22, 24 that project as intersecting lines 26, 28 on the surface 30. However, in this embodiment the fans of light are produced by a single laser 35 producing a single collimated laser beam 36. The beam 36 encounters a beam splitter 38 which partially reflects the beam at 40 and partially transmits the beam at 42. The reflected beam 40 is twice more reflected off mirrors 44 and 46, to pass through the cylinder lens 20 as shown (this could be done with only one reflection beyond the beam splitter by directing the beam 40 directly at the mirror 46, properly directed). In this embodiment, as in FIG. 1, the positions and orientations of the cylinder lenses, 20, can be manipulated relative to the axes of the approaching beams, 40 and 42, so as to optimize the projected lines, 26 and 28, for brightness and general quality on the projection surface, 30, the same surface on which the instrument may rest.

Figure 1A:
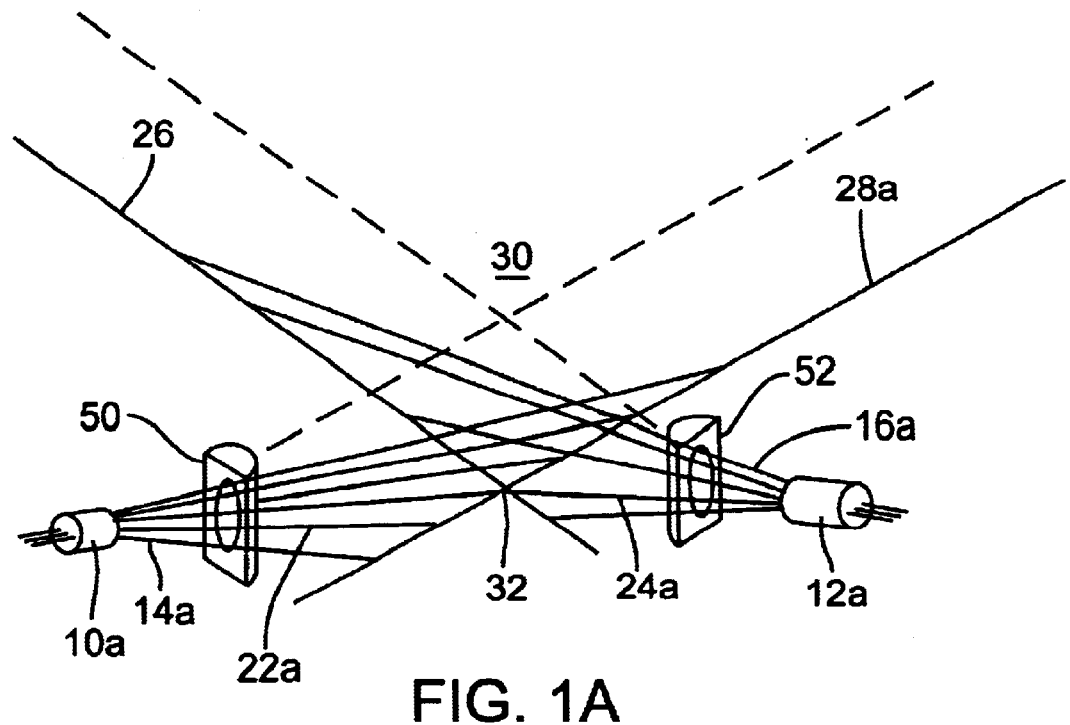
FIG. 1A is a view similar to FIG. 1 but with different optics.

In the embodiment shown in FIG. 1A, a laser projector 10a produces a beam which is not collimated and which projects a generally elliptical diverging beam of light 14a, wider on a long axis which is arranged perpendicular to the work surface, i.e. in a plane perpendicular to the surface 30. Similarly, a laser projector 12a produces a like beam 16a. In this case, the laser diodes' naturally widely diverging beams are employed to produce fans of light 22a, 24a. A cylindrical lens 50 is used for the beam 14a, arranged with its axis essentially at right angles to the position of the cylinder lens 18 of FIG. 1, and generally perpendicular to the work surface 30. A cylinder lens 52 is used for the beam 16a in a similar arrangement. The purpose of the cylinder lenses 50, 52 is not to produce a fan of light as it was in FIG. 1, but to converge the beam in the smaller axis of divergence. Thus, if the raw beam is diverging at an angle of about 10° (at full width half maximum) on the minor axis, this diverging angle will be focused so that the beam after the lens 50 will be converging to form a substantially focused line 28a on the surface. The beam 22a exiting the cylinder lens 50 is converging as regards the narrow dimension of the approximately elliptical beam (the parallel direction in the far field of the diode beam), due to the positioning of the lens 50 in the path of the beam, toward the approximate focus at the line 28a. The line 28a has a length along which the distance from the diode and the lens 50 varies, partially depending on the height of the diode from the projection surface. To achieve a high quality projected line the focus must be adjusted accordingly. This can be accomplished by appropriately tilting the cylinder lens 50, which in essence creates a lens with variable focal length. The situation is the same at the other cylindrical lens 52, receiving and focusing the light from the diode 12a. Note that due to angular effects the cylinder lens creates a varying focal length effect in any event, even if not tilted. The tilt is set to produce the highest quality projected line possible. If desired a lens with built-in variation in focal length throughout the lens' length could be used.

In all of FIGS. 1, 1A, and 2, the diodes and optical components are mounted in a housing or frame such that the intersection point 32 is projected on a surface 30 (such as a floor) outside the instrument (and preferably on which the instrument is placed), for clear visibility of the intersection point 22 by the user. It should be understood that the optical arrangements shown in FIGS. 1, 1A and 2 can produce any angular relationship desired between the two lines on the surface, between 0° and 180°. Also, it should be understood that the configuration shown in FIG. 1A can also be employed in FIG. 2, provided the optical path of the reflected portion of the laser diode beam is sufficiently short so that the reflectors and the second cylindrical lens need not be inordinately large due to the diverging beam.

Figure 3:
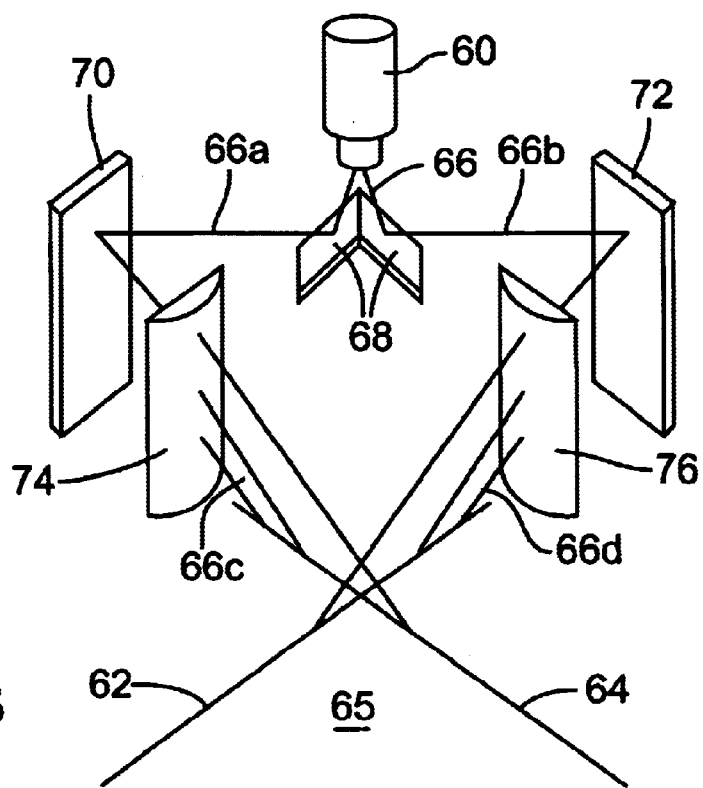
FIG. 3 is another schematic perspective view showing a further implementation of the invention involving a single laser diode.

FIG. 3 shows in schematic perspective a preferred arrangement in which one laser diode 60 is used to produce two intersecting lines of light 62, 64 on a surface 65. In this implementation, like that of FIG. 1A, the laser diode beam 66 is not collimated. The diode is positioned such that the beam 66 straddles an angled mirror or pair of mirrors 68 in roof like configuration as shown, with the wider beam divergence angle, i.e. the perpendicular-to-junction beam intensity distribution indicated extending left to right in FIG. 3. Thus, essentially one-half of the light is projected from the roof mirror 68 at each of two secondary mirrors 70 and 72, beyond which the diverging fan of light, approximately half an ellipse in cross section at each side, is directed through a cylinder lens 74, 76 at each side. The cylinder lenses, as in FIG. 1A, do not affect divergence in the wide-divergence axis, or perpendicular axis, but only act to converge the light spreading along the smaller axis, or parallel axis. As noted above, the lenses 74, 76 can be tilted appropriately so as to adjust focus so that the entire lines 62, 64 within a useful range of length, are approximately in focus.

Other arrangements, with different numbers of mirrors, are possible to produce a result similar to that of FIG. 3. Also, the cylinder lenses 74, 76 can be positioned between the folded mirror 68 and the second reflectors 70, 72 if desired, rather than the position shown in FIG. 3. Further, by rotating the mirrors 70 and 72 and repositioning the cylinder lenses 74, 76, any angle of intersection between the lines 62 and 64, between 0° and 180° can be generated (at 180° the second mirrors 70, 72 are not needed—see FIG. 3A). The beam path is simplest if the beam portions 66a, 66b are approximately coplanar, i.e. defining planes generally perpendicular to the surface 65.

The conventional approach to generating two lines at 90°, projecting parallel to a surface, has been to pass a single collimated beam through a beam splitter. Beyond the beam splitter, the beams are then passed through cylinder lenses to generate lines. This generates the desired lines at 90°, at high accuracy, but has the drawback of hiding the point of intersection of the lines, which is in the beam splitter. In contrast, the approach of this invention uses two separately aimed lines to allow the drawing of the intersection on the desired surface.

Figure 3A:
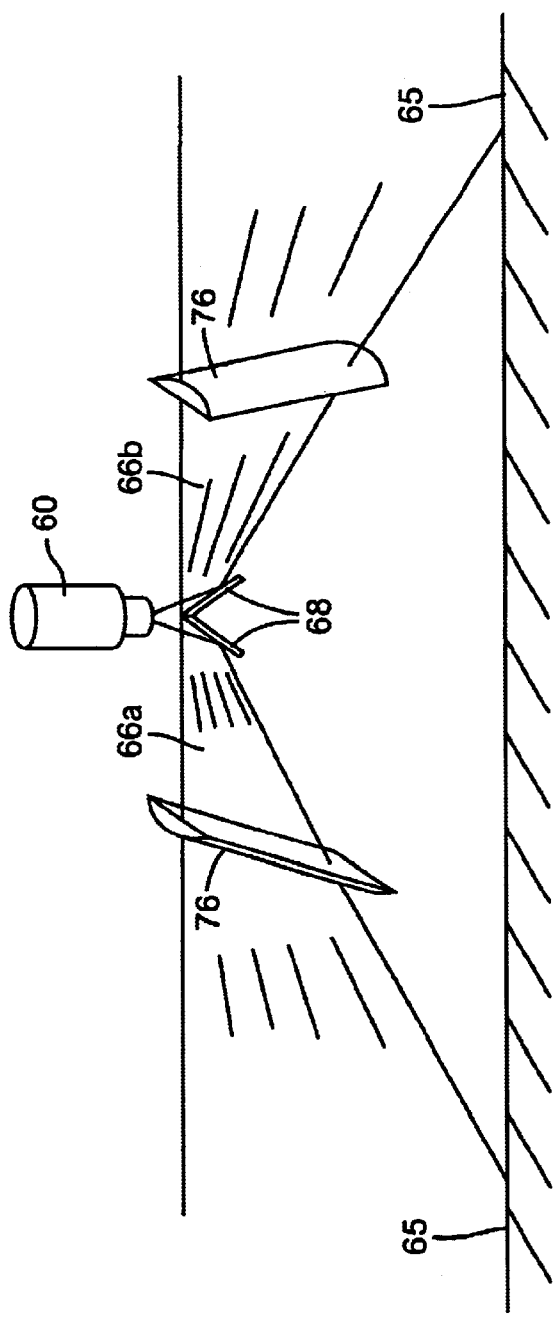
FIG. 3A is a schematic side elevation view showing another embodiment, wherein the lines at 180° are produced.

FIG. 3A shows a variation in which two oppositely directed lines, i.e. lines at 180°, are produced on a surface 65. Here, the diverging beam is again divided by a roof mirror or mirror pair 68 as in FIG. 3, but no further reflection is made on the two beam halves. Opposing fans of light 66a, 66b are focused in the lesser angle of divergence by cylinder lenses 76, 78. Again, these are tilted appropriately to produce lines of light on the surface 65 that are essentially focused throughout their length. In this case, there is no visible intersection, but the purpose is to produce lines of light in opposite directions, with the position of the instrument as a reference.

Figure 4:
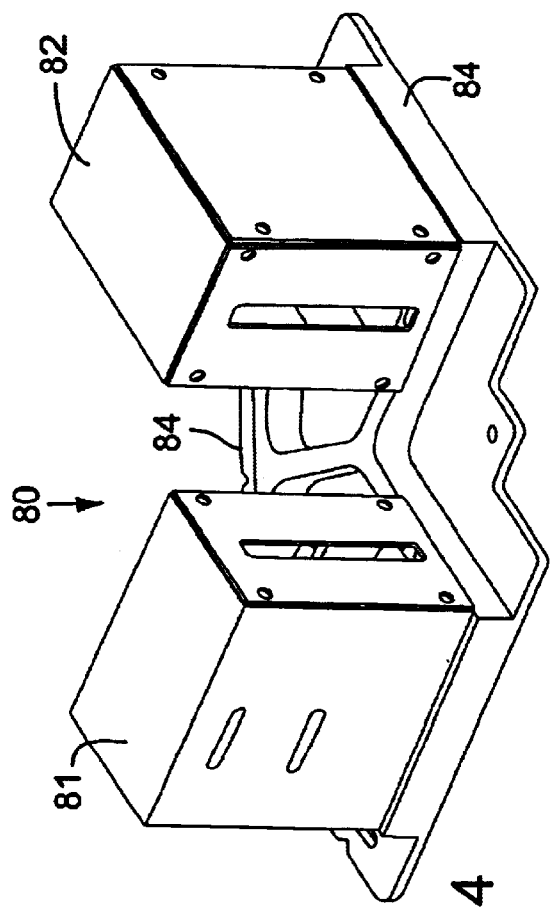
FIG. 4 is a perspective view showing the exterior of an instrument according to one preferred embodiment of the invention.

FIG. 4 shows an example of the exterior of an instrument 80 of the invention. This is an instrument with optics such as shown in FIG. 1 or FIG. 1A, using two separate laser diodes. Separate housings 81 and 82 are mounted on a base 84. As can be envisioned from FIG. 4, the two housings 81 and 82 could be repositioned at different angles relative to each other on the base 84, thus enabling the integration of a protractor into the instrument. In FIG. 4, the two housings are arranged to produce two lines of light at 90° on a surface on which the base 84 rests. An appropriate mechanism can be employed as a base, providing for rotation of one housing relative to the other, preferably about the point of intersection.

The principles of the invention can also be applied to an instrument producing more than two beams of light, having one (or more) intersections. A typical embodiment would be an instrument producing lines on a surface at right angles to one another, with a visible intersection as described above, and with an additional line projected at 45°, intersecting the other two lines at the visible intersection point. This can be achieved with three separate laser diodes, e.g. with another housing such as shown at 81 and 82 positioned at the 45° position in FIG. 4. It can also be done with a beam divider to produce three separate beam portions by spatial beam division, with further reflection of these beam segments to achieve the angularly related three fans of light. See, for example, U.S. Pat. No. 6,154,319 assigned to the assignee of the this invention, showing reflective elements for producing three, four or five beams.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A device for layout of objects or installations on a floor or other surface, along angularly related lines on said floor or surface, comprising:

a platform or housing having a reference surface for engaging a floor or other surface against which the device is to be placed, a light beam generator mounted in the platform or housing, producing and projecting from the device two fans of visible light at a desired angle relative to one another, the fans of light projecting so as to produce light lines on said floor or other surface, and the two fans of light being intersecting, said production and projection of the fans of visible light being without moving parts, wherein the light beam generator includes a laser diode producing a beam diverging at different rates on two perpendicular axes, a wide axis and a narrow axis, and the laser diode beam being left diverging on the wide axis and focused on the narrow axis so as to produce at least one fan of light, said one fan of light converging so as to produce one of said light lines essentially in focus on said floor or surface, and the fans of light projected from the device being so positioned as to produce a visible intersection of said light lines on said floor or other surface, spaced away from the instrument's platform or housing.

2. The device of the claim 1, wherein the light beam generator includes two such laser diodes, providing said two fans of light.

3. The device of 2, including a plurality of cylindrical lenses, one positioned in the path of each of the laser diode beams and oriented so as to tend to focus the uncollimated beam by converging the beam on the narrow axis but substantially not to affect the beam's divergence along the wide axis.

4. The device of claim 1, including a cylindrical lens positioned in the path of the laser diode beam, oriented so as to tend to focus the uncollimated beam by converging the beam on the narrow axis but substantially not to affect the beam's divergence along the wide axis.

5. The device of claim 4, wherein the cylindrical lens is tilted in the path of the laser diode beam so as to produce an essentially focused line along the length of said light line.

6. A device for layout of objects or installations on a floor or other surface, along angularly related lines on said floor or surface, comprising:

a platform or housing having a reference surface for engaging a floor or other surface against which the device is to be placed, a light beam generator mounted in the platform or housing, producing and projecting from the device two fans of visible light at a desired angle relative to one another, the fans of light projecting so as to produce light lines on said floor or other surface, and the two fans of light being intersecting, said production and projection of the fans of visible light being without moving parts, the fans of light projected from the device being so positioned as to produce a visible intersection of said light lines on said floor or other surface, spaced away from the instrument's platform or housing, and wherein the light beam generator includes a laser diode producing a beam diverging at different rates on two perpendicular axes, a wide axis and a narrow axis, and including a roof mirror against which the diverging light beam is directed, the roof mirror having two reflective surfaces and being positioned to divide the diverging beam across its wide axis to produce two beam portions directed in generally opposed directions, and including a cylinder lens in the path of each diverging beam portion and arranged to focus the diverging beam on the narrow axis but to leave the beam portion diverging on the wide axis, and further including a reflector in the path of each of the beam portions, either before or after the cylinder lens, arranged such that two fans of light resulting from the cylinder lenses and reflectors are directed toward said surface so as to produce said light lines on said floor in essential focus and with a visible intersection.

7. The device of claim 6, wherein said reflectors are positioned before the cylinder lenses.

8. The device of claim 6, wherein the cylinder lenses are positioned before said reflectors.

9. The device of claim 6, wherein the cylindrical lenses are tilted in the paths of the beams so as to produce an essentially focused line along the length of each of said light lines.

10. An instrument for use in layout of objects or installations on a floor or other surface, along essentially collinear and oppositely directed lines on said floor or surface, comprising:

a platform or housing having a reference surface for engaging a floor or other surface against which the device is to be placed, and a light beam generator mounted in the platform or housing, producing and projecting from the device two fans of visible light at essentially 180° to one another, the fans of light projecting so as to produce light lines on said floor or other surface, said production and projection of the fans of visible light being without moving parts, and wherein the light beam generator includes a laser diode producing a beam diverging at different rates on two perpendicular axes, a wide axis and a narrow axis, and the laser diode beam being left diverging on the wide axis and focused on the narrow axis, with a roof mirror positioned in the path of the diverging beams such as to divide the diverging beam through its wide axis to produce two essentially oppositely-directed diverging beam portions, and including a cylinder lens in the path of each diverging beam portion, arranged to leave each beam portion diverging on the wide axis, but so as to focus the beam on the narrow axis to produce fans of light which converge to produce said light lines generally in focus throughout their length on said surface.

* * * * *